United States Patent

Hasegawa

[11] Patent Number: 6,007,659
[45] Date of Patent: Dec. 28, 1999

[54] METHOD FOR PREPARING A LAMINATE

[75] Inventor: Katsuji Hasegawa, Aichi, Japan

[73] Assignee: Meinan Machinery Works, Inc., Obu, Japan

[21] Appl. No.: 08/819,629

[22] Filed: Mar. 17, 1997

[51] Int. Cl.⁶ .................................................. B32B 31/00
[52] U.S. Cl. ...................... 156/254; 156/259; 156/264; 156/286; 156/322; 156/512; 156/563; 156/583.1; 83/15; 144/348
[58] Field of Search ..................................... 156/254, 264, 156/322, 583.1; 83/15; 144/348

[56] References Cited

U.S. PATENT DOCUMENTS

| | | | |
|---|---|---|---|
| 3,205,111 | 9/1965 | Williamson et al. | 83/15 |
| 5,255,726 | 10/1993 | Hasegawa et al. | 144/365 |
| 5,564,199 | 10/1996 | Yamamoto et al. | 34/398 |
| 5,758,434 | 6/1998 | Gipson | 34/340 |

FOREIGN PATENT DOCUMENTS 2-185402  7/1990  Japan .

*Primary Examiner*—Richard Crispino
*Assistant Examiner*—Linda L Gray
*Attorney, Agent, or Firm*—Armstrong, Westerman, Hattori, McLeland and Naughton

[57] ABSTRACT

A method for preparing a laminate including pressing a heater against the upper and lower surfaces of a veneer during which an inner portion of the veneer in the thickness direction is dried to the smallest extend then the surfaces so that a water content of the inner portion is kept higher than that of the surfaces, dividing the veneer in terms of its thickness into two counter veneers, placing a ligneous board between the counter veneers using an adhesive so that the surfaces resulting from the diving are disposed as outer surfaces, and pressing a heater against the outer surfaces to effect bonding of the counter veneers and the ligneous board. The period of time for pressing the heater against the upper and lower surfaces of the veneer is such that the surfaces and a region in a vicinity thereof, against which the heaters have been pressed, are dried to a water content of between about 5% and about 20% while the inner portion of the veneer in the thickness direction is dried to a water content higher than the fiber saturation point at which contraction begins.

6 Claims, 6 Drawing Sheets

METHOD FOR PREPARING A LAMINATE

BACKGROUND OF THE INVENTION

1. Field of the Invention

The present invention relates to a method for preparing a laminate such as a plywood or an LVL (laminated veneer lumber). The method uses veneers to prepare a laminate substantially free from warp.

2. Description of the Prior Art

The applicant of the present application has previously proposed a method for preparing a laminate that undergoes only a little or no substantial warp, which comprises symmetrically laminating via an adhesive two veneers having substantially the same grains with respect to the center line in the thickness direction of the laminate to be prepared (Japanese Unexamined Patent Publication No. 185402/1990).

According to this method, if tensile or compressive forces are caused due to extension or contraction of the veneers themselves during or after the preparation thereof or contraction by curing of the adhesive, the tensile or compressive forces are symmetrically balanced with respect to the center line in the direction of the thickness of the laminate. Accordingly, if veneers made of a wood of a kind which undergoes considerable warp or the like by drying (for example, Radiata Pine) are used, a laminate which undergoes only a little warp.

In the above preparation method, an undried veneer is divided in its thickness direction with a divider such as a blade to obtain two veneers having substantially the same grains (hereinafter referred to as counter veneers), and the counter veneers are dried to water contents of 5 to 15% which are suitable for bonding, and the dried counter veneers are superposed on another ligneous board as a center in a manner as described above, and the resultant is heat-pressed by means of a hot press to complete bonding. However, the method has the following problems.

When a veneer made of a wood of a kind which undergoes considerable warp or the like by drying is used, dried counter veneers can be prevented from being appropriately transferred to a predetermined place due to occurrence of warp or the like. Further, it is difficult to manually or mechanically superpose the counter veneers in the above-mentioned symmetrical relationship with precision. These lead to problems of lowered yield and impaired quality of the product. To overcome the problems, it has been attempted that undried counter veneers are superposed, without being dried after the division, on another ligneous board as a center via an adhesive and the resultant is heat-pressed. However, if the counter veneers have high water contents, bonding failure is caused. Accordingly, a satisfactory laminate cannot be obtained.

SUMMARY OF THE INVENTION

The present invention has been made to solve the above problem. Accordingly, the present invention provides a method for preparing a laminate which comprises:

pressing a first heater against upper and lower surfaces of a veneer for a predetermined period of time to effect appropriate drying, dividing the veneer in terms of its thickness into two counter veneers by means of an appropriate divider, placing another ligneous board between the counter veneers via an adhesive in such a manner that surfaces resulting from the dividing are disposed as outer surfaces, and that grains of the counter veneers substantially conform to each other, and pressing a second heater against the surfaces resulting from the dividing to effect bonding of the counter veneers and the ligneous board.

According to the present invention, the veneer has its upper and lower surface portions heat-pressed by the first heater for a predetermined period of time, and thus the inner portion of the veneer in the thickness direction is dried to the smallest extent and retained at a high level of water content. Consequently, the surfaces resulting from the dividing by means of the divider such as a blade are satisfactory. Further, the counter veneers are substantially free of contraction as a whole and thus substantially flat, although the portions near the surfaces thereof heated by the first heater have low water contents. As a result, the subsequent transfer of the counter veneers is smoothly carried out, and it is possible to manually or mechanically superpose the counter veneers in the above-described symmetrical relationship with precision.

Accordingly, even if a veneer made of a wood of a kind which undergoes considerable warp or the like by drying is used, a laminate having high quality can be obtained without lowering yield.

It is preferred that the period of time for pressing the first heater against the veneer be shorter than the period of time just enough for the drying by the heat-pressing to bring a water content of an inner portion of the veneer in the thickness direction to the fiber saturation point through the drying by the heat-pressing. By virtue of this, the inner portion in the direction of the thickness is kept at a water content higher than the fiber saturation point. Consequently, the veneer is kept flat as a whole.

Depending upon the kind of wood of which the veneer is made, if drying is carried out for the period of time shorter than the period of time just enough to bring the water content of the inner portion of the veneer in the thickness direction to the fiber saturation point, the surface portions of the veneer are likely to have water contents which can cause contraction of the dimension of the veneer in the direction perpendicular to the fiber direction. If two counter veneers prepared by dividing such a veneer are superposed and bonded onto another ligneous board via an adhesive, the resulting plywood can undergo warp. To solve this problem, in a preferred embodiment, the period of time for pressing the first heater against the veneer is shorter than the period time which allows the veneer to begin to contract in the direction perpendicular to the fiber direction. By virtue of this, the veneer after the drying by means of the first heater is substantially flat, and the obtained plywood is prevented from undergoing warp.

Further, it is more effective to use, as the first and second heaters, heating platens each of which has its pressing surface provided with a plurality of vapor discharging grooves extending from one end to the other end of the pressing surface.

DESCRIPTION OF THE PREFERRED EMBODIMENTS

The present invention will be described in detail with reference to preferred embodiments.

First, a press dryer 1 as a first heater will be described which is preferably used for carrying out the method for preparing a laminate according to the present invention.

Figure 1:
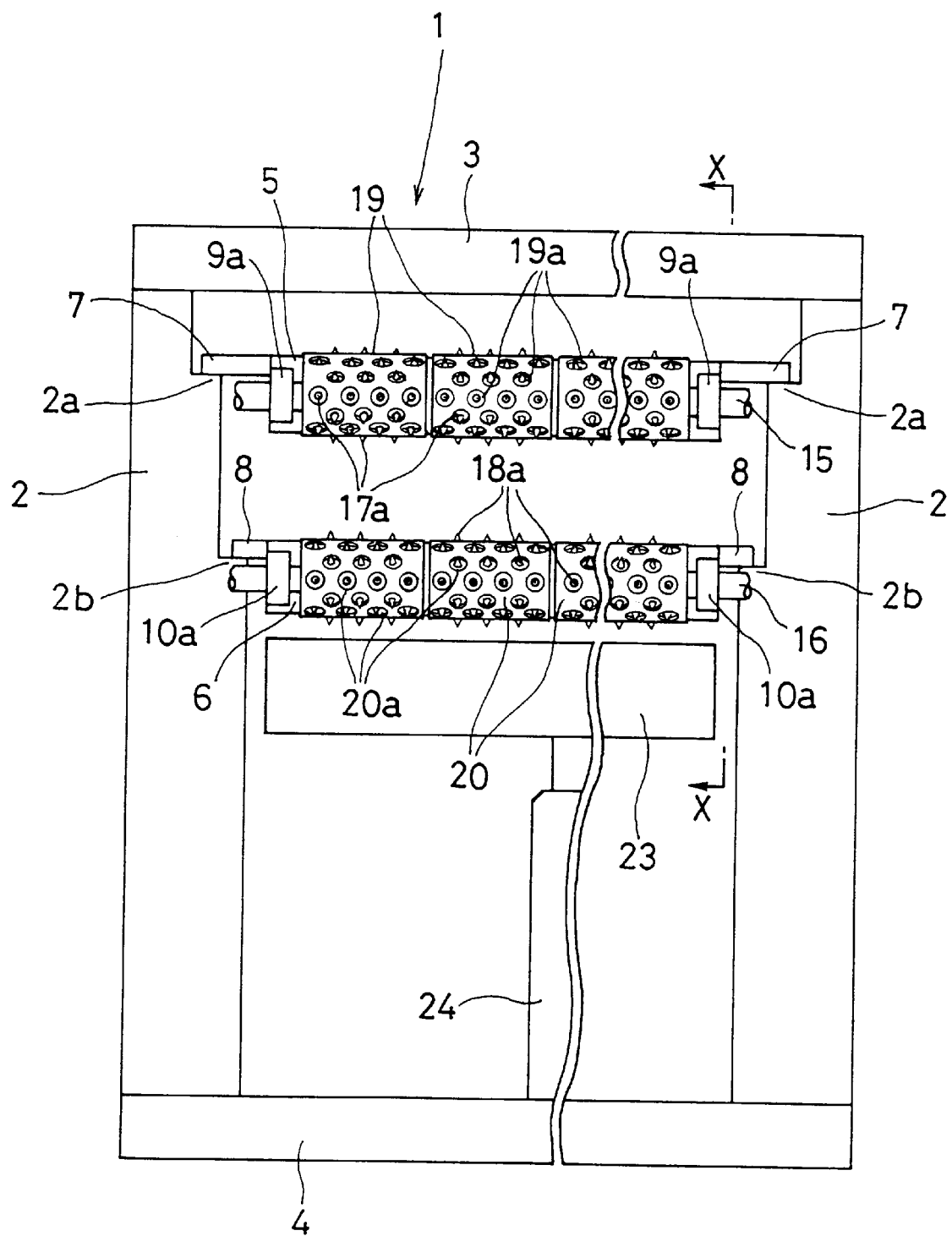
FIG. 1 is an illustrative front view of the press dryer 1, which is viewed from veneer feeding side.
Figure 2:
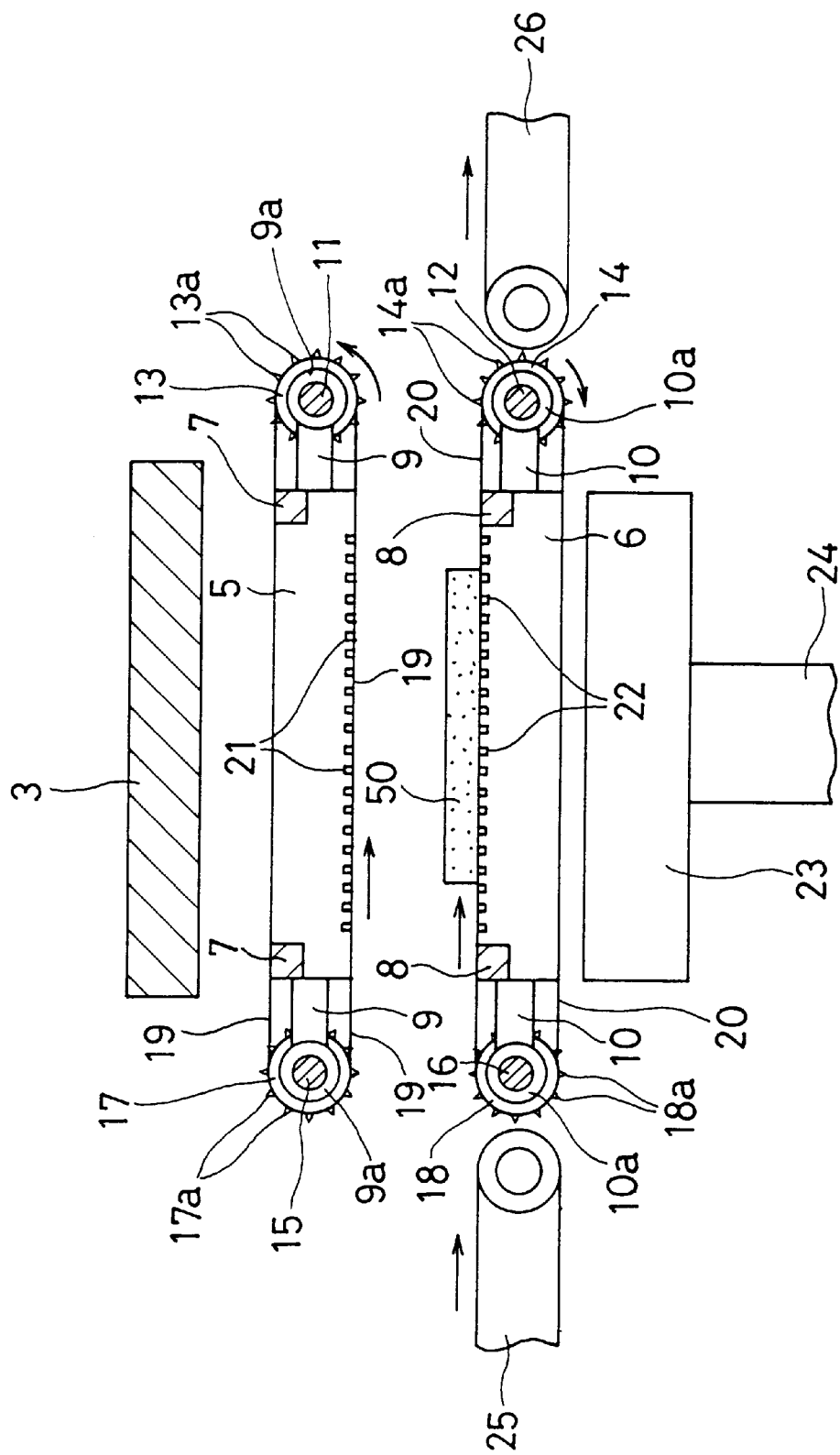
FIG. 2 is an illustrative partially sectional view taken along chain-dotted line X—X in FIG. 1.

FIG. 1 is an illustrative front view of the press dryer 1 as a first heater for drying a veneer, which is viewed from veneer feeding side. FIG. 2 is an illustrative partially sectional view taken along chain-dotted line X—X in FIG. 1. The dryer 1 comprises a bed 4 as a base, supporting posts 2, 2 vertically mounted on the bed 4, and an upper pressing plate 3. In each of inner sides of the supporting posts 2, 2, a first notch 2a and a second notch 2b below the first notch 2a are provided.

Between the supporting posts 2, 2, a first heating platen 5 and a second heating platen 6 are disposed. Each of the heating platens 5, 6 has a length (dimension in the right-left direction in FIG. 1) of about 2,500 mm and a width (dimension in the right-left direction in FIG. 2) of about 1,500 mm. In each of the heating platens, a flexible hose (not shown) running therethrough, into which steam is fed, is provided to heat it at a temperature of about 150° C. As shown in FIG. 1, to the first heating platen 5, first arms 7 are fixedly attached each of which extends horizontally and has a length that allows the first arms 7 to bridge-wise rest on the first notches 2a. Likewise, to the second heating platen 6, first arms 8 are fixedly attached each of which extends horizontally and has a length that allows the first arm 8 to bridge-wise rest on the second notches 2b. The heating platens 5, 6 are brought into the stand-by condition when the respective first arms 7, 8 are supported by the first and second notches 2a, 2b.

As shown in FIG. 2, the heating platens 5, 6 are further fixedly provided, in their sides perpendicular to the sides provided with the first arms 7, 8, with second arms 9, 10, respectively, which also extend horizontally. One (right arm in FIG. 2) of the second arms 9 is rotatably provided with a rotating shaft 11 via a bearing 9a. Likewise, one (right arm in FIG. 2) of the second arms 10 is rotatably provided with a rotating shaft 12 via a bearing 10a. On the rotating shafts 11, 12, a plurality of rolls 13, 14 each having a width of about 250 mm are fixedly mounted, respectively. The rolls 13, 14, have their circumferential surfaces provided with protrusions 13a, 14a in rows at intervals of about 50 mm in such a manner that neighbouring rows are spaced about 25 mm apart in the rotational direction and neighbouring rows are spaced about 25 mm apart in the direction perpendicular to the rotational direction. To each of the rotating shafts 11, 12, a servomotor (not shown) is connected. By means of the servomotors, the rolls 13 and the rolls 14 are rotated in the directions shown by the arrows, respectively, and stopped.

The other (left arm in FIG. 2) of the second arms 9 is rotatably provided with a rotating shaft 15 via a bearing 9a. Likewise, the other (left arm in FIG. 2) of the second arms 10 is rotatably provided with a rotating shaft 16 via a bearing 10a. On the rotating shafts 15, 16, a plurality of rolls 17, 18 are fixedly mounted which have their circumferential surfaces provided with protrusions 17a, 18a in the same positional relationship as in the rolls 13, 14, respectively.

Around the rolls 13 and rolls 17 mounted on the first platen 5 and around the rolls 14 and rolls 18 mounted on the second platen 6, a plurality of belts 19 and 20 provided with holes 19a and 20a are mounted, respectively, each of which is made of a stainless steel and has a thickness of about 0.5 mm and a width of about 250 mm. The holds 19a and 20a are provided in the traveling direction and in the direction perpendicular to the traveling direction at the same intervals as the protrusions 13a and 14a and have diameters of about 12 mm to enable insertion of the protrusions 13a and 14a therein, respectively. Each of the belts 19, 20 is in the form of an endless belt with its ends bonded together preferably by a heat resistant adhesive tape or the like. Each of the belts is caused to travel or stop by rotating or stopping the rolls 13, 14 the servomotor (not shown).

Further, the lower surface of the first platen 5 and the upper surface of the second platen 6 are provided with grooves 21 and 22 which extend in the direction perpendicular to the traveling direction of the belts 19 and 20 at intervals of 12 mm, respectively, and each of which has a width of about 3 mm and a depth of about 2 mm. The grooves 21 in the lower surface of the first heating platen and the grooves 22 in the upper surface of the second heating platen 6 are positionally different from each other by about 6 mm in the traveling direction of the belts 19 and 20.

Under the second heating platen 6, a supporting plate 23 is disposed which has the same size as that of the second heating platen 6 and a rigidity higher than that of the second heating platen 6. A pressure-controllable hydraulic cylinder 24 is mounted on the bed 4 for vertically moving the supporting plate 23.

As shown in FIG. 2, a feeding conveyor 25 for feeding a veneer between the first and second heating platens 5, 6 is placed on the upstream side (left side in FIG. 2) of the belts 19, 20, and a delivery conveyor 26 for delivering the veneer which has been dried is placed on the downstream side (right side in FIG. 2).

In the following, one form of a divider for dividing a veneer into two slices will be described which is preferably used in the method for preparing a laminate according to the present invention. The divider 30 is described in detail in Japanese Unexamined Patent Publication No. 185402/1990 which has been filed by the assignee of the present application and is incorporated herein by reference. As illustratively shown in FIG. 3, the divider 30 comprises a base (not shown), and driving shafts 31, 32 vertically opposite to each other which are rotated by a motor (not shown) supported by the base in the directions shown by arrows. On the driving shafts 31, 32, a plurality of biting transfer rolls 35, 36 having their circumferential surfaces provided with biting members 33, 34 at regular intervals in the rotational directions are mounted at regular intervals in the axial directions of the driving shafts 31, 32, respectively. The rolls 35, 36 are vertically opposite to each other with the shortest distance between tips of the biting members 33 and 34 of about 1 to 2 mm.

Figure 3:
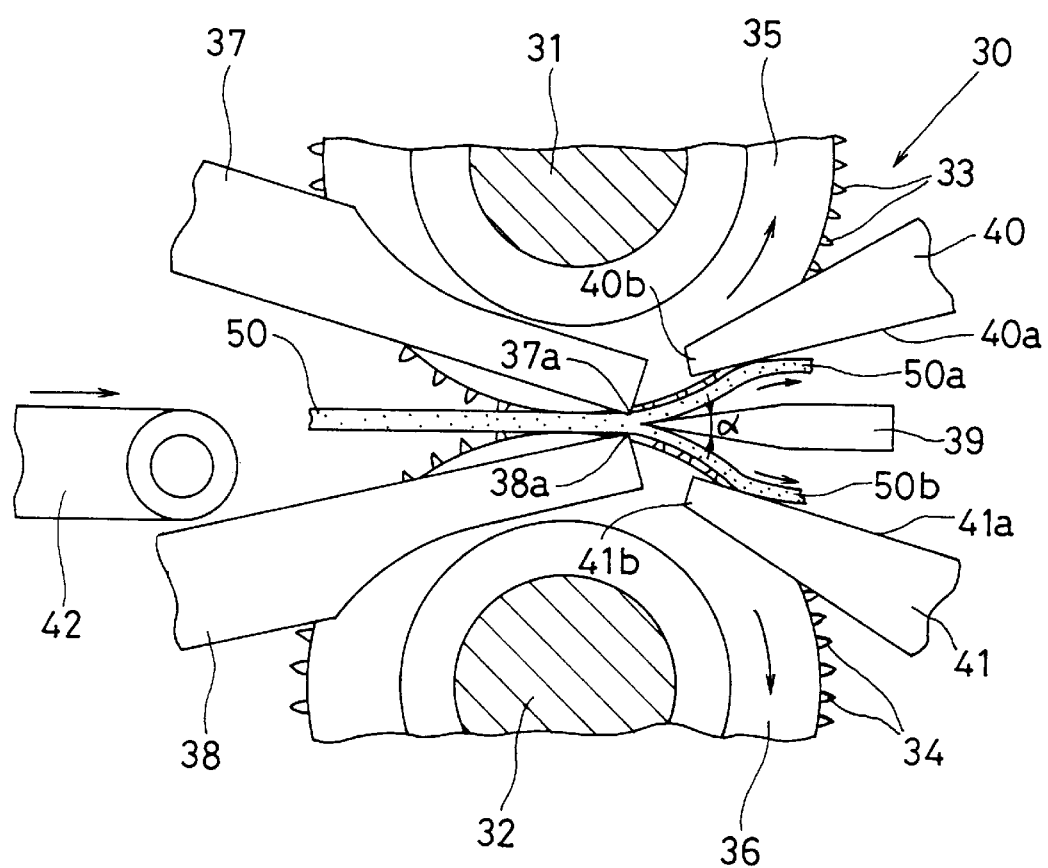
FIG. 3 is an illustrative side view of the divider 30.

Between every neighbouring rolls 35 on the driving shaft 31, a regulating member 37 is disposed. Likewise, between every neighbouring rolls 36 on the driving shaft 32, a regulating member 38 is disposed. The regulating members 37, 38 are vertically opposite to each other. Specifically, as shown in FIG. 3, the regulating members 37, 38 are supported by the base (not shown) at one ends thereof, and corner points 37a, 38a of the other ends are located on the delivery side (right side in FIG. 3) of the vertical phantom line connecting rotational axes of the driving shafts 31, 32 and are oppositely located at equal distances from the horizontal phantom line passing the middle point between the driving shafts 31, 32. The regulating members 37, 38 are arranged in such a manner that the distance between the opposite corner points 37a, 38a corresponds to 90% of a thickness of a veneer to be divided.

On the delivery side (downstream side) of the regulating members 37, 38, a dividing blade 39 is fixedly attached to the base (not shown) with its edge on the horizontal phantom line and facing toward the feeding side (upstream side) and with its edge angle α of 24 degrees equiangularly divided by the horizontal phantom line.

The divider is further provided with detaching members 40, 41 vertically opposite to each other and horizontally opposite to the regulating members 37, 38, respectively. The detaching members 40, 41 are also supported by the base (not shown) at one ends thereof, and the other ends 40b, 41b are located in the vicinities of the dividing blade 39 to provide surfaces 40a, 41a intersecting rotational locus of the tip of the biting members 33 of the biting transfer rolls 35 and rotational locus of the tip of the biting members 34 of the biting transfer rolls 36, respectively.

On the feeding side of the biting transfer rolls 35, 36, a conveyor 42 is disposed for feeding a veneer between the regulating members 37, 38. The conveyor 42 may be the delivery conveyor 26 of the press dryer 1.

Figure 4:
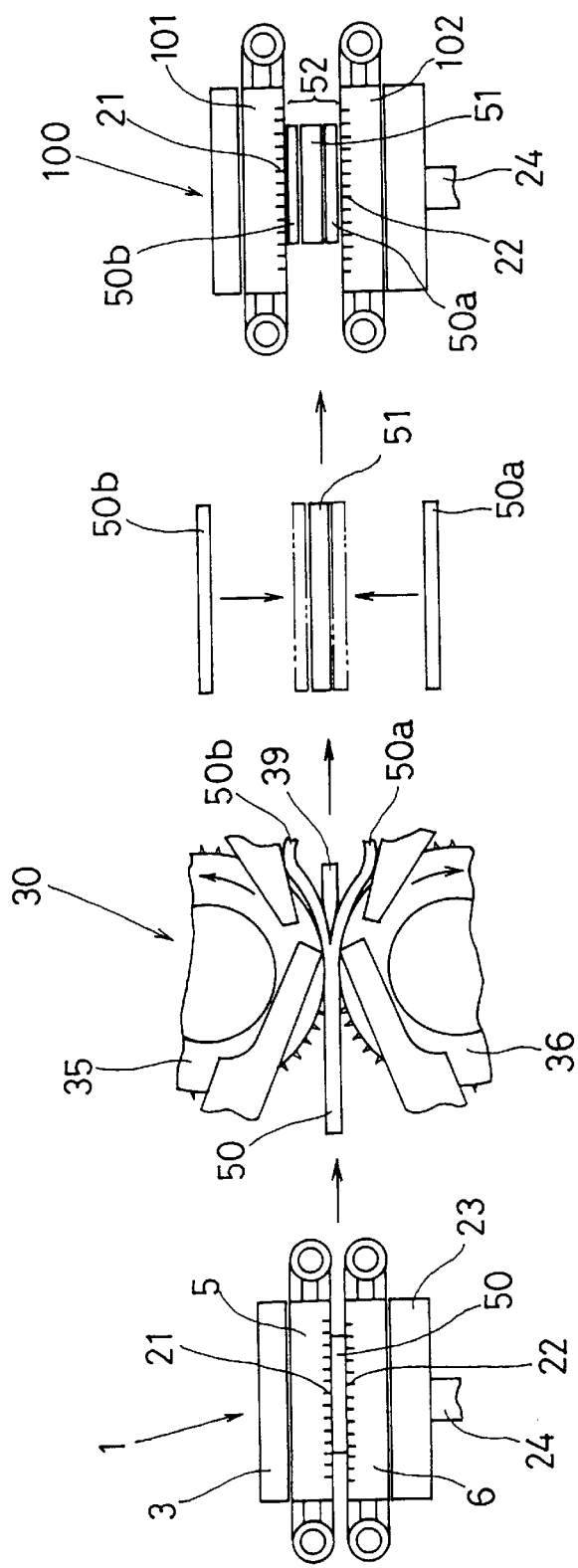
FIGS. 4(a) to (d) is a schematic flow sheet illustrating steps of the method for preparing a laminate according to the present invention.

In the following, with reference to FIG. 4, a case where a three-ply plywood (laminate) is prepared from a veneer 50 and a center 51 will be described by way of an example of the method for preparing a laminate according to the present invention.

First, in the press dryer 1 shown FIGS. 1 and 2, pressure of the hydraulic cylinder 24 during pressing is so pre-set as to be about 2 kg per 1 square centimeter of an undried veneer 50. As in FIG. 2, the feeding conveyor 25 is actuated to travel in the direction shown in the arrow, and the rolls 13, 14 are rotated in the directions shown by the arrows to cause the belts 19, 20 to travel, respectively. A veneer 50 of Radiata Pine, which has a thickness of about 3 mm, a dimension in the fiber direction of about 1,800 mm and a dimension in the direction perpendicular to the fiber direction of about 900 mm, is placed on the feeding conveyor 25 in such a manner that the transfer direction is the direction perpendicular to the fiber direction.

The veneer 50 is carried by the feeding conveyor 25 and subsequently by the belt 19. When the veneer 50 arrives at the central position of the second heating platen 6, the feeding conveyor 25 and rolls 13, 14 are stopped. In this connection, the holes 19a and 20a of the belts 19 and 20 and the grooves 21, 22 are arranged as described above, so that the holes 19a, 20a and the grooves 21, 22 overlap each other irrespective of the position where the belts 19, 20 are stopped.

Then, the hydraulic cylinder 24 is actuated to ascend, and the supporting plate 23 is thereby raised to abut upon the second heating platen 6. The supporting plate 23 is further raised, and consequently, the second heating platen 6, which is supported in such a manner that the first arms 8 are bridge-wise put on the second notch 2b, is raised with the veneer 50 placed thereon. The supporting plate 23 is still further raised, and the second heating platen 6 is thereby further raised to abut upon the first heating platen 5 via the veneer. The supporting plate 23 is continued to ascend, thereby also raising the first heating platen 5. In consequence, the first heating platen 5 is caused to abut upon the upper pressing plate 3. The supporting plate 23 is further raised with the first platen abutting upon the upper cover plate, until the pre-set pressure of the hydraulic cylinder 24 is reached. Thereupon, the ascent of the supporting plate is stopped [see FIG. 4(a)].

The veneer 50 is thereby pressed between the first heating platen 5 and the second heating platen 6 and heated by the heats of the heating platens 5, 6 which are transmitted thereto through the belts 19, 20, respectively, to vaporize moisture contained in the veneer 50. If the veneer were in an air-tight condition, the resulting vapors could not be discharged from the veneer. As described above, however, the apertures 19a, 20a of the belts 19, 20 which are in contact with the veneer 50 are aligned with the grooves 21, 22, respectively. The vapors are led from the apertures 19a, 20a into the grooves 21, 22 and discharged from ends of the grooves 21, 22 into the atmospheric air.

The drying in this manner is carried out for about 30 seconds to about one minute. Thereafter, the hydraulic cylinder 24 is operated to ascend, thereby lowering the supporting plate 23 to the original position. In consequence, the first heating platen 5 and the second heating platen 6 are supported at the original positions shown in FIG. 1 in such a manner that their first arms 7, 8 bridge-wise rest on the first notch 2a and the second notch 2a, and on the second heating platen 6, the veneer 50 is on standby.

In the above treatment, by appropriately controlling the period of contact between the upper and lower surfaces of the veneer 50 and the first and second heating platens 5, 6, i.e., the pressing time, the veneer 50 can be dried such that side portions in the thickness direction near the surfaces against which the first and second heating platens 5, 6 have been pressed are dried to a water content of about 5 to about 20%, while the inner portion in the thickness direction is moderately dried to a water content higher than the fiber saturation point at which contraction begins. As a result, the veneer 50 as a whole undergoes no substantial contraction. Accordingly, it is possible to obtain such a treated product which is still substantially flat.

Then, the rolls 13, 14 are again rotated in the directions shown by arrows, and the delivery conveyor 26 is actuated to travel. The veneer 50 is thereby transferred from the belt 19 to the delivery conveyor 26. Then, the veneer 50 having its upper and lower surface portions appropriately dried is fed into the divider 30 and bisected by the divider in terms of the thickness. In this connection, the veneer 50 is placed on the feeding conveyor 42 of the divider 30 in such a manner that the transfer direction is the direction perpendicular to the fiber direction.

In the divider, the veneer 50 is fed between the regulating members 37, 38 and transferred while having bitten its upper and lower surfaces with biting members 33, 34 of the biting transfer rolls 35, 36 which are rotating. In other words, the veneer 50 is transferred while being firmly held. Then, the veneer 50 is pressed in the thickness direction by the corner points 37a, 38a of the other ends of the regulating members 37, 38, and while thereby substantially preventing undesirable crack from occurring, the veneer is bisected in terms of thickness into veneers 50a, 50b (hereinafter refedded to as counter veneers), each of which has a thickness of about 1.5 mm, by means of the dividing blade 39. The counter veneers 50a, 50b are still bitten with the biting members 33, 34 after the bisection, respectively. However, by the presence of the detaching members 40, 41 having the surfaces 40a, 41a intersecting rotational locus of the biting members 33, 34, respectively, the counter veneers 50a, 50b are detached from the biting members 33, 34 in sequence by the surfaces 40a, 41a. Each of the counter veneers 50a, 50b is then transferred in the right direction [see FIGS. 3 and 4(b)].

In cutting or dividing of a wood with a blade, the surface resulting from the cutting or dividing is generally preferable when the wood has a water content as high as 30% or more. In the above dividing operation, the inner portion in the thickness direction of the veneer 50 is moderately or barely dried and thus has a high water content. Accordingly, the surfaces of the counter veneers 50a, 50b, which have resulted from the division with the dividing blade 39, are satisfactory.

In the thus prepared counter veneers 50a, 50b by the division, each of the surface portions which have been heated by the heating platens has a low water content as described above. However, the veneers 50a, 50b as a whole have undergone no substantial contraction and thus are still substantially flat, as in the veneer 50.

Consequently, the subsequent transfer of the counter veneers, which will be described below, is smoothly carried out. Further, it is possible to manually or mechanically superpose the counter veneers 50a, 50b on the upper and lower surface the center in the symmetrical relationship as described above with precision.

If the undivided veneer 50 has non-uniformity in its water content in the fiber direction and/or the direction perpendicular thereto, the non-uniformity still remains substantially unchanged after the division as non-uniformities in water contents in the resulting counter veneers 50a, 50b. It is, however, to be noted that in general, the non-uniformities in water contents in the counter veneers 50a, 50b are substantially the same.

Figure 5:
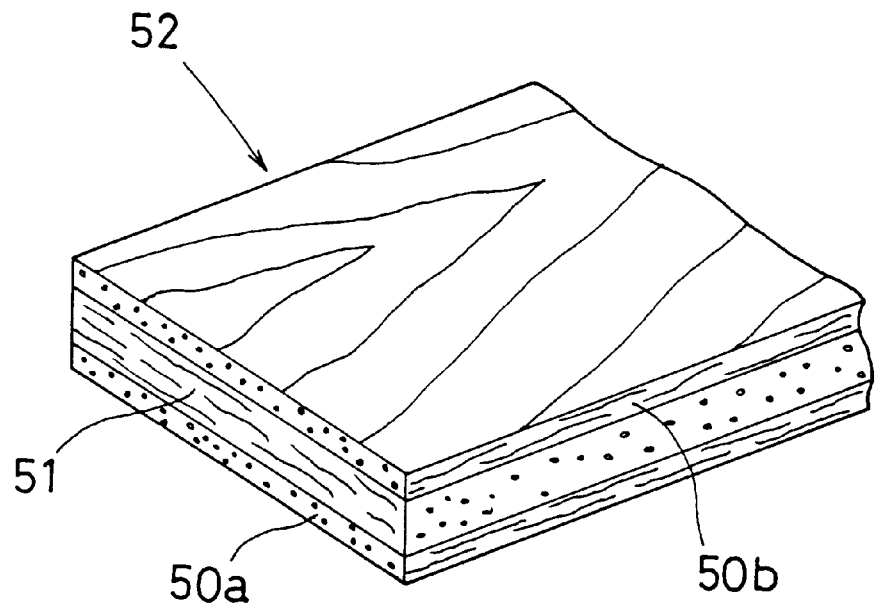
FIG. 5 is an illustrative view of a 3-ply plywood.

Separately, a center 51 is prepared which has the same planar size as those of the counter veneers 50a, 50b and whose fiber direction is perpendicular to those of the counter veneers 50a, 50b and which has been dried to a water content of about 10% as a whole and which has a thickness of about 3 mm. To the upper and lower sides of the center 51, a urea resin adhesive is applied which is one of thermosetting adhesives. On the center 51, the counter veneers 50a, 50b are superposed in such a manner that the sides against which the first and second heating platens 5, 6 have been pressed are adjoined to the center 51, i.e., the sides resulting from the division are so located as to form the outer surfaces, and that grains of the counter veneers 50a, 50b substantially conform to each other [see FIG. 4(c)]. Then, a hot press 100 as a second heater is used which has substantially the same structure as that of the press dryer 1 shown in FIG. 1 and 2. In this case, pressure of the hydraulic cylinder 24 is so pre-set as to be about 8 kg per 1 square centimeter of a veneer which is used in usual bonding, and temperatures of the first and second heating platens 101, 102 are pre-set to be 160° C. Using the hot press having such a structure as described above, the resultant from the superposition is pressed between the first and second heating platens 101, 102 for about 5 minutes to complete bonding. Consequently, moisture contained in portions near the division-derived surfaces of the counter veneers 50a, 50b is vaporized, and the resulting vapors are led from the apertures 19a, 20a into the grooves 21, 22 and discharged from ends of the grooves 21, 22 into the atmospheric air. Accordingly, bonding failure so-called "puncture" due to vapor pressure is prevented to a great extent from occurring, and the counter veneers 50a, 50b are dried in a short time and, as a whole, rendered substantially uniform in water content. Further, the sides of the counter veneers 50a, 50b against which the first and second heating platens 5, 6 have been pressed are used as bonding surfaces (interfacial surfaces), and these sides have already been dried to a water content suitable for bonding. Accordingly, heats from the first and second heating platens 101, 102 of the hot press 100 are advantageously transmitted through the surfaces of the counter veneers 50a, 50b to the interfaces with the center 51 to satisfactorily effect bonding therebetween, thus obtaining a plywood (laminate) 52 as shown in FIG. 5.

In the above-described preparation of the plywood 52, the counter veneers 50a, 50b have not only substantially the same water contents as a whole but also substantially the same non-uniformities in their water contents when superposed on the center 51. This is because the counter veneers 50a, 50b are prepared by bisecting the same parent veneer 50 in terms of the thickness. Consequently, a portion of the counter veneer 50a and a portion of the counter veneer 50b which are symmetrically located relative to the center have substantially the same water contents. For example, when the former portion has a high water content, the latter portion also has substantially the same water content as that of the former. Likewise, when the former has a low water content, the latter also has a water content as low as that of the former.

When the superposition-resultant having such an arrangement is dried by heat-pressing with the hot press to complete bonding, such symmetrically located portions of the counter veneers 50a, 50b which have substantially the same water contents are subjected to reductions in their water contents to substantially the same extents. Accordingly, even if the water contents of the symmetrically located portions are reduced to, for example, 30% or less to thereby cause contractions in the symmetrically located portions, amounts and directions of the contractions in the symmetrically located portions are substantially the same. By virtue of this, even if tensions are caused by such contractions in the counter veneers 50a, 50b, these tensions in the plywood 52 are substantially in symmetrically counterpoise relative to the center 51. Accordingly, the plywood 52 generally undergoes no substantial warp.

In the above-described embodiment where the veneer 50 is made of Radiata Pine, when the veneer 50 is heat-pressed by means of the press dryer 1 as the first heater for about 30 seconds to about one minute as described above, the inner portion in the thickness direction is dried to a water content higher than the fiber saturation point at which contraction begins. However, depending upon kinds of wood of which veneers are made or depending upon thicknesses of veneers or water contents of veneers prior to drying even if they are made of the same kind of wood, water contents of the veneers resulting from drying vary greatly. Accordingly, in some cases, the time for heat-pressing should be changed.

In such cases, the time for heat-pressing is determined as follows.

A veneer is prepared which is made of the same kind of wood and has the same size as those of a veneer intended to be dried by heat-pressing. The veneer prepared is heat-pressed by means of the first and second heating platens 5, 6 at the same temperature under the same pressure as in the above embodiment, for example, for 15 sec., 30 sec., 45 sec., 1 min., 1 min. and 15 sec., . . . until the veneer reaches absolute dry condition while measuring the weight of the veneer at the intervals of 15 seconds. Then, water contents at the times of the weight measurements are calculated based on the absolute dry weight. As the "time for heat-pressing by means of the first heater", there is preferably selected a period of time 15 to 30 seconds shorter than the time when the water content of the veneer reached 30% which is a typical fiber saturation point of wood. This is because when the water content reaches 30%, the inner portion of the veneer in the thickness direction can also reach a water content of 30%. If the heat-pressing is terminated 15 to 30 seconds before this time, the inner portion of the veneer surely has a water content of more than the fiber saturation point. Consequently, the resulting veneer is substantially flat. By virtue of this, the veneer is transferred smoothly and provides preferable results in the division by means of the divider 30.

Of course, a shorter period such as a period 45 seconds or 1 minute shorter than the time when the water content of 30% is reached may be selected. If such a shorter period is selected, it follows that the inner portion has a water content higher than the fiber saturation point. This is preferred in terms of the division by means of the divider 30. However, It is preferred that the veneer be dried to have lower water contents at its surfaces, because the lower water contents enable the subsequent bonding operation to be completed in a shorter time. On the whole, the selection of the period mentioned in the preceding paragraph.

In the determination of the water contents, an electric moisture meter may simply be used. The period may be selected based on the results of this determination, as in the above selection.

In the following, the second embodiment of the present invention will be described.

In the first embodiment, the time for the heat-pressing of a veneer by means of the first and second heating platens 5, 6 as a first heater is selected in the above-described manner. In some veneers, however, if drying by heat-pressing is carried out for such a period of time shorter than the period of time just enough to bring water contents of inner portions of the veneers in the thickness direction to the fiber saturation point, the surface portions of the veneers are likely to have water contents which can cause contraction of the dimension of the veneers in the direction perpendicular to the fiber direction.

When such a veneer 50 is divided into counter veneers 50a, 50b and these counter veneers are bonded to a center 51 with an adhesive as in the first embodiment, the resulting plywood is likely to undergo warp. The reason for this is considered to be as follows.

When the veneer 50 is dried by heat-pressing with the first and second heating platens 5, 6 as described above, it is difficult to control the first and second heating platens 5, 6 to have temperatures equal to each other, and even in the same heating platen, it is difficult to impart thereto a temperature almost perfectly uniform throughout the heating platen. Accordingly, the upper and lower surface portions of the heat-pressed veneer 50 are likely to have unequal water contents.

In consequence, when the upper and lower surface portions of the veneer 50 are brought to water contents lower than the fiber saturation point, the upper and lower surface portions undergo contractions in different amounts although the veneer is substantially flat as a whole. If the veneer 50 in such condition is divided into counter veneers 50a, 50b and the counter veneers 50a, 50b are superposed on a center 51 via an adhesive with the contracted surfaces adjoined to the center 51 and these are heat-pressed by means of the hot press, the counter veneers 50a, 50b are bonded to the center 51 by curing of the adhesive and further dried by the heating with the hot press to thereby contract. It is difficult to confirm which of the contractions of the adhesive and the veneers due to the heating occurs earlier or whether these occurs in parallel. However, it is supposed that the contraction of the adhesive occurs earlier, and that the water contents of the surface portions of the counter veneers 50a, 50b which are to be bonded to the center 51 are 13% and 10%, respectively, and the former and the latter are dried to 7% and 5% by the heating with the hot press. (In this connection, a veneer having a lower water content tends to be less susceptible to drying. Accordingly, even in veneers which have water contents initially different from each other, the water contents tend to ultimately converge.) It follows that the counter veneers 50a, 50b undergo contractions in amounts corresponding to the reductions of 6% and 5% in the water contents, respectively. These amounts of the contractions are, of course, different from each other. In other words, the contractions are out of symmetrical balance with respect to the center 51. Actually, this can give rise to warp. On the other hand, if the counter veneers 50a, 50b which have been dried to the above water contents gradually absorb moisture in the air to water contents of about 15% which is a usual equilibrium water content, the counter veneers 50a, 50b extend beyond the dimensions prior to the bonding by amounts corresponding to the water contents of 2% and 5% which are the differences between 15% and 13% and between 15% and 10%. Consequently, the extensions are out of symmetrical balance with respect to the center 51. This also gives rise to warp.

The second embodiment is capable of further diminishing occurrence of warp of a plywood and carried out as follows.

The press heater 1 and the divider 30 are used as in the first embodiment, but the period of time for heat-pressing the veneer 50 by means of the first and second heating platens 5, 6 of the press heater 1 is selected as follows.

A veneer is prepared which is made of the same kind of wood and has the same size as those of a veneer intended to be dried by heat-pressing, as in the first embodiment. First, the initial dimension of the veneer in the direction perpendicular to the fiber direction is measured precisely. Then, the veneer prepared is heat-pressed by means of the first and second heating platens 5, 6 under the same conditions as in the first embodiment, for example, for 15 sec., 30 sec., 45 sec., 1 min., 1 min. and 15 sec., . . . while measuring the dimension of the veneer 50 in the direction perpendicular to the fiber direction at the intervals of 15 seconds. From the measured dimensions, the time when the dimension of the veneer for the first time becomes smaller than the initial dimension is specified. A period of time about 30 seconds (including an allowance) shorter than the specified time is selected as the "time for heat-pressing by means of the first heater". The veneer 50 is dried by means of the press heater 1 as a first heater for the selected time period and then divided by the divider 30 as in the first embodiment to prepare counter veneers 50a, 50b. The subsequent step is carried out using the hot press 100 as a second heater as in the first embodiment to obtain a plywood 52. In this embodiment, the heat-pressing is performed for about 6 minutes.

By virtue of this, even if the veneer 50 after the drying by means of the press dryer 1 has a difference between its water contents in upper and lower surface portions, it is substantially free form warp and thus substantially flat. Further, to obtain the plywood 52, the veneer 50 is divided by means of the divider 30 into the counter veneers 50a, 50b, and the counter veneers superposed on a center 51, and the resultant is heated by means of the first and second heating platens 101, 102 of the hot press 100 as a second heater. The thus obtained plywood 52 undergoes less warp as compared with that in the first embodiment. Moreover, if the counter veneers 50a, 50b gradually absorb moisture in atmospheric air to water contents of about 15% which is a usual equilibrium water contents, the plywood undergoes less warp as compared with that in the first embodiment.

In the above, the embodiments of the present invention have been described. However, the following modifications may be made.

Figure 6:
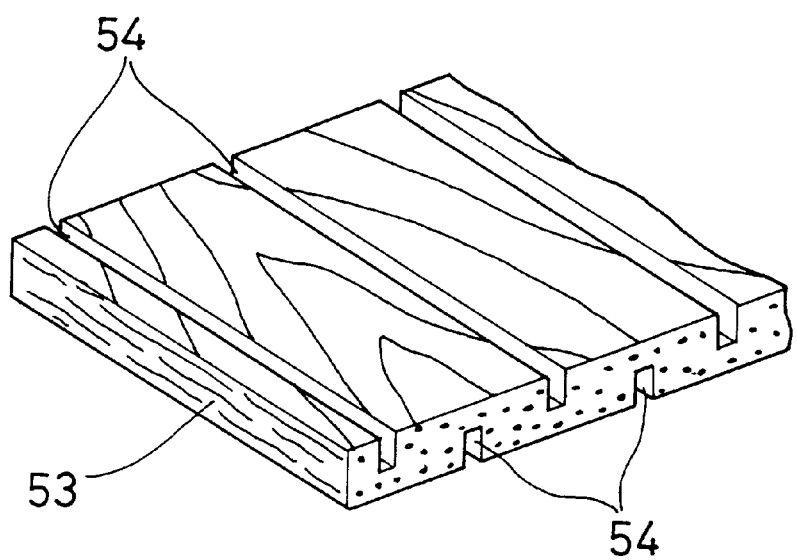
FIG. 6 is an illustrative view of a center.

(1) In the first embodiment, a three-ply plywood is prepared using the center 51 which is dried to a water content suitable for bonding as a whole. In this respect, modification may be made as follows. As shown in FIG. 6, an undried center 53 has its upper and lower sides provided with grooves 54, each of which extends in the fiber direction and has a width of about 1 mm and a depth of about 2 mm, in such a manner that the grooves 54 are located at intervals of about 50 mm and that the grooves 54 in the upper side and grooves 54 in the lower side alternate with each other in the direction perpendicular to the fiber direction at intervals of about 25 mm. The center 53 is heat-pressed between the first and second heating platens 5, 6 by means of the press dryer 1 for one minute under the same conditions as in the drying of the veneer 50 in the first embodiment. In this heat-pressing, moisture in portions near the upper and lower surfaces of the center 53 is vaporized and the vapors are discharged through the grooves 54 of the center 53 as well as the grooves 21, 22 of the heating platens 5, 6. By virtue of this, the upper and lower surface portions of the center 53 is dried to a condition suitable for bonding in a short time as compared with the case where the grooves 54 are not provided.

On the other hand, counter veneer 50a, 50b are prepared by means of the press dryer 1 and the divider 30 as in the first embodiment. To the upper and lower surfaces of the dried center 53, a urea resin adhesive is applied. On the center 53, the veneers 50a, 50b are superposed in such a manner that grains of the counter veneers 50a, 50b substantially conform to each other. The thus superposed counter veneer 50a, center 53 and counter veneer 50b are heat-pressed by means of the hot press 100 whose pressure and temperature have been pre-set to be 8 kg per 1 square centimeter of a veneer and 150° C., respectively.

By employing this procedure, the surfaces of the center 53 as well as the surfaces of the counter veneers 50a, 50b which are subjected to the bonding, i.e., all of the surfaces which are subjected to the bonding have been dried by the press dryer 1. Consequently, the bonding is satisfactorily effected. Further, in the heat-pressing by the hot press 100, moisture still contained in the counter veneers 50a, 50b and moisture contained in the center 53 are vaporized and the resulting vapors are discharged through the grooves 21, 22 of the first and second heating platens 101, 102 and through the grooves 54, respectively.

Accordingly, the resulting plywood scarcely undergoes warp. In addition, even if the center 53 is not sufficiently dried, moisture in each of the plies is readily discharged. This enables a shortened time for drying of the center prior to the bonding step to be realized.

(2) In the above, the embodiments where a three-ply plywood is prepared have been described. When a five-ply plywood is prepared, the procedure is, for example, as follows.

Figure 7:
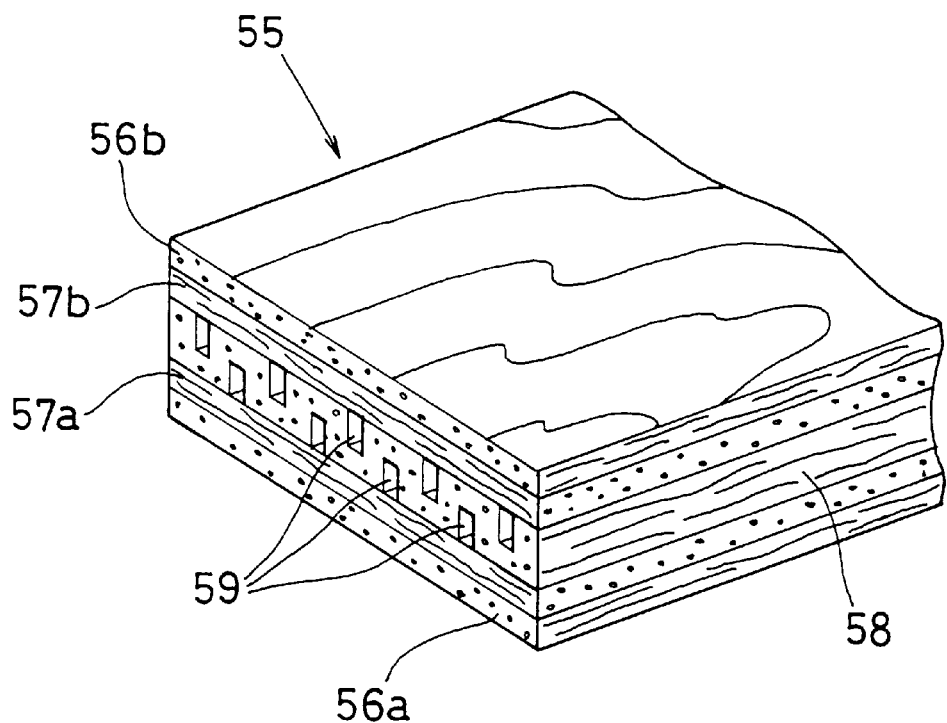
FIG. 7 is an illustrative view of a 5-ply plywood.
Figure 8:
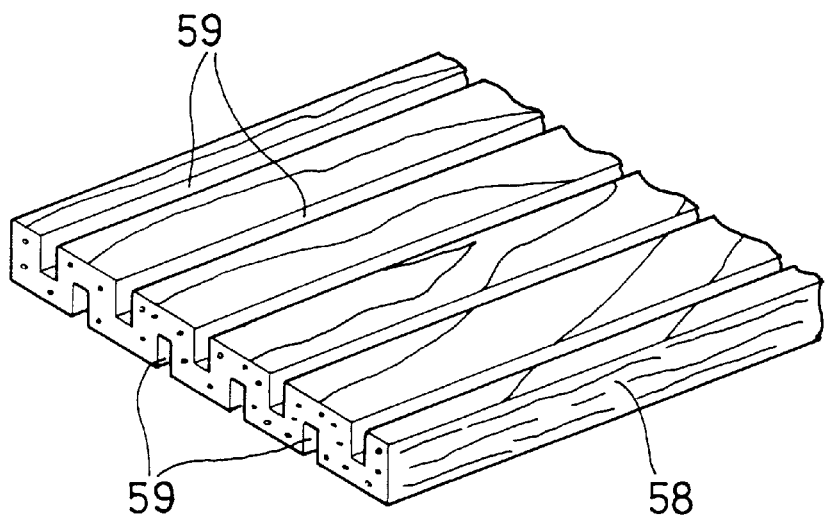
FIG. 8 is an illustrative view of a center of the 5-ply plywood in FIG. 7.

As shown in FIGS. 7, 8, counter veneers 56a, 56b, cross-bands 57a, 57b and a center 58, each of which has a length of about 1,800 mm and a width of about 900 mm, are used. In this connection, each of the cross-bands has the 900 mm width in the direction perpendicular to the fiber direction. For preparing the counter veneers 56a, 56b and the cross-bands 57a, 57b, a veneer having a thickness of about 3.4 mm as measured prior to division and a veneer having a thickness of about 4.4 mm as measured prior to division are used, respectively. Each of the parent veneers has its upper and lower sides dried by means of the press dryer 1 as a first heater and then divided by the divider 30, in the same manner as in the above embodiments. As a result, two pairs of the veneers (four veneers in total) are prepared.

As shown in FIG. 8, the center 58, which has a thickness of about 3.4 mm, has its upper and lower surfaces provided with grooves 59 each of which extends in the fiber direction and has the same size and is located at the same intervals as in the grooves of center 53 shown in FIG. 5. Then, upper and lower surfaces of the center 58 are dried by means of the press dryer 1 as a first heater under the same conditions as in the above embodiments.

Then, a urea resin adhesive is applied to both sides of each of the cross-bands 57a, 57b. On the center 58, the cross-bands 57a, 57b are superposed in such a manner that the sides thereof which have been dried by the press dryer 1 are adjoined to the center 58, and that grains thereof substantially conform to each other. On the resulting three-ply intermediate, the counter veneers 56a, 56b are further superposed in such a manner that the sides thereof which have been dried to conditions suitable for bonding are adjoined to the three-ply intermediate, and that grains of the thereof substantially conform to each other.

The resultant comprising the thus superposed 5 plies is heat-pressed for about 10 minutes by means of the hot press 100 whose pressure and temperature have been pre-set to be 8 kg per 1 square centimeter of a veneer and 150° C., respectively.

By this procedure moisture, in the center 58 and moisture in the cross-bands 57a, 57b are vaporized and discharged through the grooves 59 provided in the center 58, and moisture in the counter veneers 56a, 56b are vaporized and discharged through the grooves 21, 22 of the first and second heating platens 101, 102 of the press dryer 1. Consequently, the bonding is satisfactorily effected. A 5-ply plywood is thus obtained.

In this bonding, with respect to the cross-bands 57a, 57b and the counter veneers 56a, 56b which are symmetrically located relative to the center 58, respectively, portions thereof which are symmetrically located have substantially the same grains and substantially the same water contents. Accordingly, even if the veneers and the adhesive are contracted due to the heat-pressing for the bonding, the obtained plywood generally undergoes no substantial warp as in the plywoods obtained in the above embodiments. Further, even if a ply or plies containing moisture in a large amount is included, moisture in each of the plies is readily discharged. Accordingly, bonding failure so-called "puncture" is prevented to a great extent from occurring. Moreover, the heat-pressing for bonding is also utilized for drying of the center, thereby enabling a shortened period of preliminary drying step to be realized.

If a urea resin adhesive is used to bond plies, formalin is likely to ooze from the resulting plywood to cause a practical problem. However, if grooves are provided in a center as in the modified embodiment in the above item (1) and this modified embodiment, the grooves enables formalin to smoothly escape when heat-pressing for bonding is carried out and when the resulting plywood is allowed to stand after the preparation.

(3) In each of the above-described embodiments, the press dryer 1 is used as a first heater. Instead thereof, a hot press may be used which is generally used in bonding of plies, i.e., whose heating platens provided with no grooves in their pressing surfaces. In this pressing, the heating plates with no grooves in their pressing surfaces are pressed against a veneer. However, by releasing the pressure of the hot press, for example, every about 20 seconds, vapors resulting form the pressing are discharged to prevent the veneer from being damaged. Alternatively, the heating platens may be pressed against a veneer with a wire netting interposed between the veneer and each of the heating platens, thereby permitting discharge of vapors emitted from the veneer through gaps provided by the wire nettings. This eliminates the need to release the pressure of the hot press.

Further, instead of the hot press 100 as a second heater, such a usual hot press may be used. In this case, pressure of the hot press is likewise released every about 20 seconds. However, when no substantial emission of vapors is reached, the release is no longer necessary. Thereafter, the heating platens may be pressed against veneers uninterruptedly until adhesive is sufficiently cured. If the pressing is conducted with wire nettings interposed between the heating platens and the veneers, the need to release the pressure of the hot press is also eliminated.

(4) In the preparation of the 5-ply plywood described in the item (2), the counter veneers 56*a*, 56*b*, cross-bands 57*a*, 57*b* and the center 58 are superposed via the adhesive and the bonding of these plies are effected in one heat-pressing operation. However, a 5-ply plywood may be prepared as follows.

The center 58 is dried in a usual drying device so as to have a water content of about 10% as a whole which is suitable for bonding. Then, an adhesive is applied to both sides of the center 58. Separately, to prepare cross-bands 57*a*, 57*b*, a veneer double the thickness thereof has its upper and lower sides dried by means of the press dryer 1 as a first heater and then divided by means of the divider 30 as in the embodiment in the item (2). The thus prepared cross-bands 57*a*, 57*b* are superposed on the center 58 in such a manner that the sides which has been dried by means of the press dryer 1 are adjoined to the center 58, and that grains of the cross-bands 57*a*, 57*b* substantially conform to each other in a symmetrical relationship with respect to the center 58. Then, the cross-bands 57*a*, 57*b* and the center 58 are heat-pressed by means of the hot press 100 as a second heater whose pressure and temperature have also been pre-set to be 8 kg per 1 square centimeter of a veneer and 150° C., respectively, to complete bonding, thereby preparing a 3-ply plywood. Then, an adhesive is applied to both sides of the 3-ply plywood.

Also separately, to prepare counter veneers 56*a*, 56*b*, a veneer double the thickness thereof has its upper and lower sides dried by means of the press dryer 1 as a first heater and then divided by means of the divider 30. The thus prepared counter veneers 56*a*, 56*b* are superposed on the 3-ply plywood in such a manner that the sides which has been dried by means of the press dryer 1 are adjoined to the 3-ply plywood, and that grains of the counter veneers 56*a*, 56*b* substantially conform to each other. Then, the superposed plies are heat-pressed by means of the hot press 100 as a second heater whose pressure and temperature have also been pre-set to be 8 kg per 1 square centimeter of a veneer and 150° C., respectively, to complete bonding, thereby preparing a 5-ply plywood.

In this procedure, the cross-bands 57*a*, 57*b* are bonded to the center 58 to prepare the 3-ply plywood. In the 3-ply plywood, symmetrically located portions of the cross-bands 57*a*, 57*b* relative to the center 58 which have substantially the same grains and water contents. Accordingly, even if the veneers are contracted by the heat-pressing for the bonding, the 3-ply plywood generally undergoes no substantial warp for the same reasons as described in the above embodiments. Further, if the counter veneers 56*a*, 56*b* are heat-pressed for bonding to the 3-ply plywood substantially free from warp to cause contractions of the counter veneers, portions of the counter veneers 56*a*, 56*b* which are symmetrically located with respect to the center 58 have substantially the same textures and water contents. Accordingly, if contractions of the counter veneers are caused due to the heat-pressing for bonding, the resulting plywood generally undergoes no substantial warp for the same reason as described in the above embodiment.

If the center 58 has a high water content, it is preferred to provide the center with grooves as indicated by the reference number 59 in FIG. 6.

When it is intended to prepare a plywood comprising 7 plies or more, one or more pairs of counter veneers may be bonded to the 5-ply plywood one after another in the same manner as in the preparation of such a 5-ply wood from the 3-ply plywood.

(5) The embodiments where a plywood is prepared have been described. However, in an LVL comprising a plurality of veneers all or most of which are superposed with their fibers in the same direction, the counter veneers prepared by drying veneers by means of the press dryer 1 as a first heater and dividing the dried veneers with the divider 30 as in the cases of plywood may be symmetrically superposed with respect to the center line in the thickness direction and bonded in the symmetrically superposed condition.

(6) In the above embodiments, the upper and lower surfaces of the veneers prior to the dividing in the thickness direction is dried by means of the heating platens in a short time to dry only surface portions of the veneer to the desired conditions. However, the upper and lower surfaces of the veneer may be dried by a means for blowing hot air thereon as a first heater.

(7) In the above embodiments, a urea resin adhesive which is a thermosetting adhesive is used as an adhesive. However, other adhesives may be used as the adhesive so long as they are thermosetting adhesives, such as a melamine resin adhesive. The adhesive may be in the form of a sheet, which is placed between plies and cured by heating to effect bonding.

(8) In the above embodiments, a veneer is used as a center. However, the center may be a ligneous board such as a fiber board or a particle board. In a word, any board may be used as the center so long as it is bondable to a veneer.

(9) In the above embodiments, a blade is used as a divider for dividing a veneer in terms of thickness. However, a veneer may be divided with a traveling endless band saw of a band sawing machine. Alternatively, a veneer may be divided with a thin (small thickness) steel band which has its one side sharply edged is looped to form an endless continuous edge and which travels as a band saw does in a band sawing machine.

(10) In the above embodiments, heating platens are used as first and second heaters. Alternatively, a veneer or adhesive-applied plies whose upper and lower surfaces are to be dried may be passed through between a plurality of vis-a-vis pairs of heating rolls appropriately spaced apart to heat-press the upper and lower surfaces.

As described above, according to the present invention, even a veneer made of a wood of a kind which undergoes considerable warp or the like by drying may be appropriately transferred after drying of the veneer, and it is possible to manually or mechanically superpose the counter veneers in the above-described symmetrical relationship with precision. Accordingly, the problems are solved that yield is lowered and that quality of the product is impaired.

What is claimed is:

1. A method for preparing a laminate comprising the steps of:

pressing a first heater against upper and lower surfaces of a veneer for a predetermined period of time during which an inner portion of the veneer in the thickness direction is dried to the smallest extent than the surfaces so that a water content of the inner portion is kept higher than that of the surfaces;

dividing the veneer in terms of its thickness into two counter veneers by means of an appropriate divider;

placing a ligneous board between the counter veneers via an adhesive in such a manner that surfaces resulting from the dividing are disposed as outer surfaces, and that grains of the counter veneers substantially conform to each other; and pressing a second heater against the surfaces resulting from the dividing to effect bonding of the counter veneers and the ligneous board, wherein the period of time for pressing the first heater against the veneer is such that the surfaces and a region in a vicinity thereof, against which the first heaters have been pressed, are dried to a water content of between about 5% and about 20%, while the inner portion of the veneer in the thickness direction is dried to a water content higher than the fiber saturation point at which contraction begins.

2. The method according to claim 1, wherein the first heater is heating platens.

3. The method according to claim 1, wherein the second heater is heating platens.

4. The method according to claim 1, wherein the first heater is heating platens each of which has its pressing surface provided with a plurality of vapor discharging grooves extending from one end to the other end of the pressing surface.

5. The method according to claim 1, wherein the second heater is heating platens each of which has its pressing surface provided with a plurality of vapor discharging grooves extending from one end to the other end of the pressing surface.

6. The method according to claim 1, wherein the divider is a blade.

* * * * *